United States Patent [19]

Ekeland et al.

[11] Patent Number: 5,391,673
[45] Date of Patent: Feb. 21, 1995

[54] SILICON RESINS AND METHODS FOR THEIR PREPARATION

[75] Inventors: Robert A. Ekeland; Leslie E. Carpenter, II, both of Midland, Mich.

[73] Assignee: Dow Corning Corporation, Midland, Mich.

[21] Appl. No.: 175,830

[22] Filed: Dec. 30, 1993

[51] Int. Cl.⁶ ............................................. C08G 77/06
[52] U.S. Cl. ........................................ 528/12; 528/21; 528/23
[58] Field of Search ............................. 528/12, 21, 23

[56] References Cited

U.S. PATENT DOCUMENTS

| | | | |
|---|---|---|---|
| 2,258,218 | 10/1941 | Rochow | 174/121 |
| 2,441,320 | 5/1948 | Hyde | 260/46.5 |
| 3,017,384 | 1/1962 | Modic | 260/46.5 |
| 3,284,406 | 11/1966 | Nelson | 260/46.5 |
| 3,627,851 | 12/1971 | Brady | 260/825 |
| 3,772,247 | 11/1973 | Flannigan | 260/46.5 |
| 4,676,182 | 4/1954 | Daudt | 260/448.2 |
| 4,677,161 | 6/1987 | Suzuki | 524/862 |
| 4,707,531 | 11/1987 | Shirahata | 528/12 |
| 4,774,310 | 9/1988 | Butler | 528/23 |
| 4,855,381 | 8/1989 | Mutoh | 528/23 |
| 5,013,808 | 5/1991 | Piskoti | 528/23 |

Primary Examiner—Melvyn I. Marquis
Attorney, Agent, or Firm—Timothy J. Troy

[57] ABSTRACT

The present invention relates to methods for making silicone resins. More particularly, the present invention relates to methods for producing silicone resins comprising monofunctional units in the form of $R_3SiO_{\frac{1}{2}}$ units and tetrafunctional units in the form of $SiO_{4/2}$ units. The methods of the present invention are characterized by a continuous process for producing silicone resins while maintaining a constant ratio of reactants thus producing less variation in the final product. The present invention is further related to the compositions produced by the methods of this invention.

30 Claims, 1 Drawing Sheet

SILICON RESINS AND METHODS FOR THEIR PREPARATION

BACKGROUND OF THE INVENTION

The present invention relates to methods for making silicone resins. More particularly, the present invention relates to methods for producing silicone resins comprising monofunctional units in the form of $R_3SiO_{\frac{1}{2}}$ units and tetrafunctional units in the form of $SiO_{4/2}$ units. The methods of the present invention are characterized by a continuous process for producing silicone resins while maintaining a constant ratio of reactants thus producing less variation in the final product. The present invention is further related to the compositions produced by the methods of this invention.

Silicone resins consisting of triorganosiloxane units ($R_3SiO_{\frac{1}{2}}$) and $SiO_2$ units are known, commercially available materials and are employed in the formulation of silicone products such as adhesives and antifoams. Such resins are sometimes referred to as MQ resins in view of the presence of the monovalent (M) siloxane units and quadrivalent or tetravalent (Q) $SiO_2$ units. Resins of this type wherein the organic groups are alkyl and methods for making them have been described in the art. For example, Rochow in U.S. Pat. No. 2,258,218 discloses a method for producing methyl silicone resins by mixing silanes having the formula $Si(X)_4$ wherein X is a halogen such as chloride with a methyl Grignard to make Me-$Si(X)_3$ which is then hydrolyzed to produce a methyl resin.

Hyde in U.S. Pat. No. 2,441,320 discloses a method of producing MQ and $PhMe_2Q$ polymers by slowly adding $RMe_2SiCl(OEt)$ wherein R is an alkyl group and Et is ethyl, and water to a silane such as tetrachlorosilane or tetraethylorthosilicate (TEOS). Two monosilanes are concurrently hydrolyzed, the hydrolysis products are then dehydrated, and the organosiloxane produced thereby recovered. Daudt et al. in U.S. Pat. No. 2,676,182 teaches a method of producing organic soluble copolymeric siloxanes by reacting silanes or siloxanes with a silica hydrosol. The silica hydrosol is prepared by reacting a water-soluble alkali metal silicate with an acid.

Modic in U.S. Pat. No. 3,017,384 teaches a method of synthesizing MQ resins by adding silanes such as trimethylchlorosilane and ethyl orthosilicate to a solvent such as toluene, this mixture is then hydrolyzed by slowly adding water to it, next the mixture was allowed to separate and the acid layer removed. A silanol endblocked polydimethylsiloxane fluid was then added to the neutralized filtered toluene-resin solution. It is further disclosed that the final resin product could then be cured into a film.

Nelson in U.S. Pat. No. 3,284,406 discloses the synthesis of MVQ (where V is a vinyldimethylsiloxy monovalent group) resins by cohydrolysis of constituent monomeric chloro or alkoxy silanes. The hydrosol may also be prereacted prior to the addition of silane with a vinyl cap before the trimethyl cap is added. Brady in U.S. Pat. No. 3,627,851 teaches a flexible coating of vinyl polydimethylsiloxane gum and MHQ (where H is a dimethylsiloxy monovalent group) resin made by the method of Daudt et al. described hereinabove.

Flannigan in U.S. Pat. No. 3,772,247 teaches the preparation of MHQ resins (precise MQ ratios given) or MDQ (where D is a dimethylsiloxy divalent group) resins or MTHQ (where T is a methylsiloxy trivalent group) resins by a variety of methods which include the method of Daudt et al. hereinabove wherein a sol is prereacted, next adding silanes, and then equilibrating the resulting mixture. Suzuki in U.S. Pat. No. 4,677,161 teaches that hydrogen and methoxy endblocked MQ resins can be prepared by cohydrolysing an alkoxysilane with TEOS in the presence of a strictly controlled amount of water and that the use of an acid catalyst is optional.

Shirahata in U.S. Pat. No. 4,707,531 discloses a method for producing an MQ resin by dripping an alkyl silicate (alkyl orthosilicate or a partial hydrolysis condensate of alkyl orthosilicate) into a mixture of aqueous hydrochloric acid which contains at least 5% hydrogen chloride and a trialkylsilane or a disiloxane or a mixture thereof, at a temperature of from 0° to 90° C. with stirring. Shirahata further teaches that polydispersity and molecular weight can be controlled by the ratios of M and Q added during hydrolysis.

Butler in U.S. Pat. No. 4,774,310 discloses a method for making MQ resins which are $Me_2H$ and $Me_3$ capped by reacting in the presence of an acidic catalyst an MQ siloxane resin and a disiloxane. Butler further describes the use of heterogeneous acid catalysts and also discloses post resin synthesis equilibration using strong acid catalysis to add $Me_2H$ functionality.

Mutoh in U.S. Pat. No. 4,855,381 discloses a method of making MQ resins by reacting an alkyl orthosilicate or a partial hydrolysis product thereof with an oligomeric organopolysiloxane in the presence of a catalyst. The catalyst is disclosed as being an acid such as a sulfonic acid compound or a phosphonitrile compound, an ion exchange resin acid catalyst, or a Lewis acid equilibration catalyst.

Piskoti in U.S. Pat. No. 5,013,808 discloses a method for preparing an alkoxysilane and a silicone resin by combining a cyclic or straight chain siloxane A with a catalyst in a reaction vessel and a silane monomer B having tri or tetra alkoxy functionality, distilling from the vessel an alkoxysilane product of a rearrangement reaction having a boiling point which is lower than the boiling point of the mixture A and B to drive the reaction to completion, and recovering from the vessel a silicone resin having alkoxy functionality and no active silanol functionality.

In contrast, the present invention is directed to a continuous method of producing silicone resins. In addition, the method of the present invention maintains a constant ratio of reactants thus producing less variation in the final product. None of the advantages of the method of the instant invention are disclosed by the references described hereinabove.

SUMMARY OF THE INVENTION

It is an object of this invention to provide improved methods for producing silicone resins.

It is also an object of this invention to provide improved methods for the preparation of silicone resins containing tetrafunctional siloxane units, $SiO_2$, end monofunctional siloxane units, $R_3SiO_{\frac{1}{2}}$, without the problems and disadvantages in the above described prior art.

It is an additional object of this invention to provide novel methods for the preparation of a variety of organosilicon resins and improved control over the content of the resulting material.

It is a further object of this invention to provide a method for producing silicone resins in a continuous manner.

In another object of this invention, a method of producing silicone resins which includes maintaining the reactants at a constant ratio throughout the method is disclosed.

A further object of this invention is to provide a method for making siloxane resins which results in little product variation.

These and other features, objects and advantages of the present invention will be apparent upon consideration of the following detailed description of the invention.

BRIEF DESCRIPTION OF THE DRAWING

The objects of the invention will be seen by reference to the detailed description of the invention taken in connection with the accompanying drawing, in which.

DETAILED DESCRIPTION OF THE INVENTION

Figure 1:
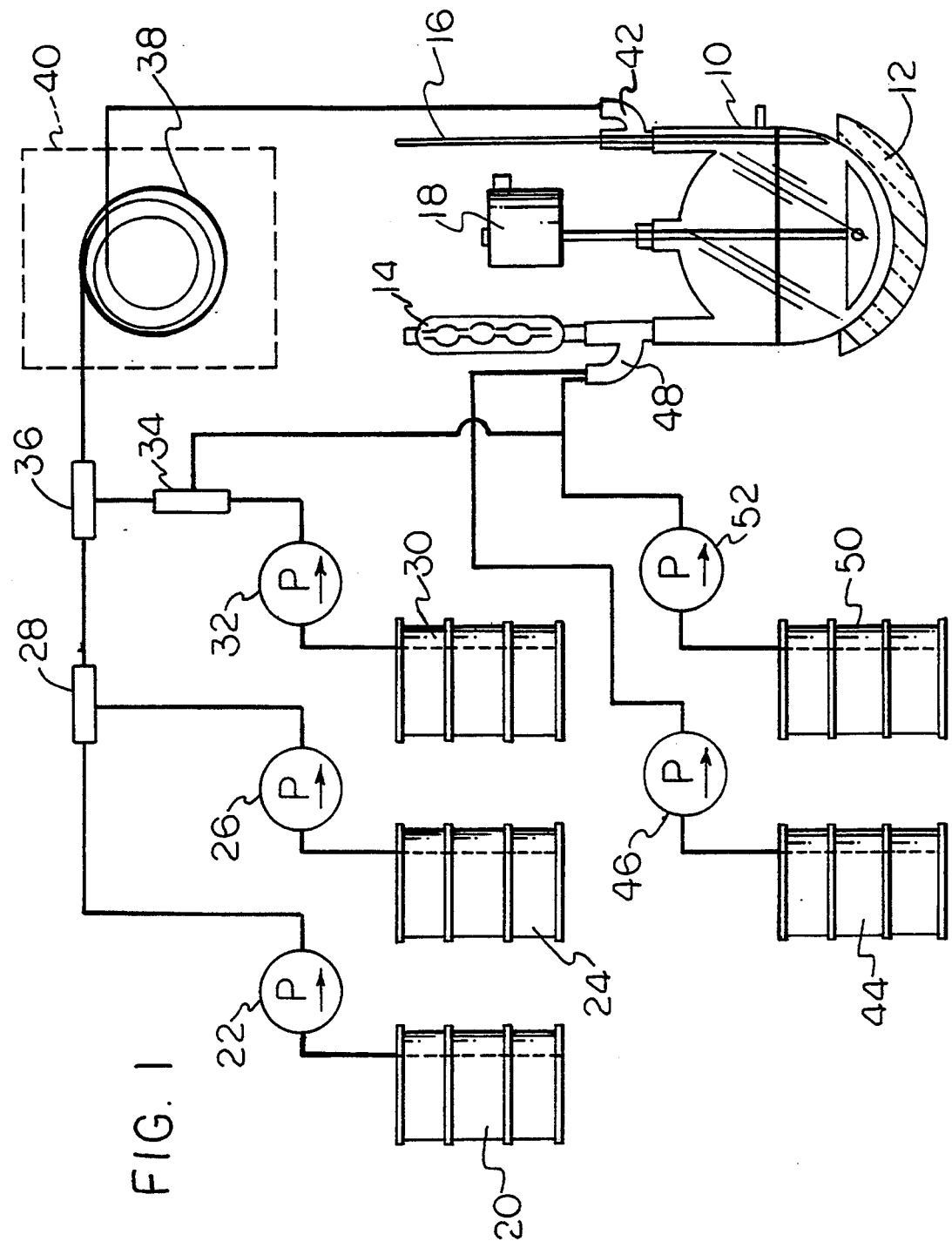
FIG. 1 is a schematic representation of a reaction apparatus for performing the subject methods of the instant invention. Arrows in the drawing are located on feed lines and indicate the direction of the fluid flow.

The present invention relates to a first method for making a silicone resin, the method comprising the steps of (I) mixing in a continuous manner a silane selected from the group consisting of (a) a silane having the formula $SiX_4$ wherein X is a halogen atom or a group having the formula OR wherein R is a group selected from the group consisting of alkyl groups having from 1 to 6 carbon atoms, aryl groups, and arylalkyl groups; (b) alcohol treated halogenated silanes; and (c) alkyl silicates having units of the formula

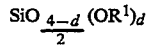

$$SiO_{\frac{4-d}{2}}(OR^1)_d$$

or a partial hydrolysis condensate thereof, wherein $R^1$ is a group selected from the group consisting of alkyl groups having from 1 to 6 carbon atoms, aryl groups, and arylalkyl groups, and d has a value of from 1 to 3, with a condensation catalyst; (II) adding a quenching agent to the reaction mixture of (I) whereby an aqueous layer or a condensation catalyst layer and an organic-silicone resin containing layer are formed, (III) separating the aqueous layer from the organic-silicone resin containing layer, and (IV) stripping the organic-silicone resin containing layer, wherein the ratio of said silane to said condensation catalyst is constant throughout said method.

Herein the term "continuous manner" as applied to the methods of the present invention, generally denotes that fresh starting materials are continuously fed (supplied) to any suitable mixing apparatus such as a static mixer or a mix loop.

Step (I) in the method of the present invention comprises mixing in a continuous manner the above described silane with a condensation catalyst. Silane (a) in the method of this invention is a silane having the formula $SiX_4$ wherein X is a halogen or a group having the formula OR wherein R is a group selected from the group consisting of alkyl groups having from 1 to 6 carbon atoms, aryl groups, and arylalkyl groups. Halogens suitable as X in the method of this invention include fluorine, chlorine, bromine, and iodine. It is preferred for the method of this invention that X is chlorine, and thus preferred as silane (a) in the method of this invention is tetrachlorosilane ($SiCl_4$). X in silane (a) of step (I) of the method of this invention can also be a group having the formula OR wherein R is a group selected from the group consisting of alkyl groups having from 1 to 6 carbon atoms, aryl groups, and arylalkyl groups. Alkyl groups suitable as R in the method of this invention include methyl, ethyl, propyl, butyl, and hexyl, aryl groups are exemplified by phenyl and naphthyl, and arylalkyl groups are exemplified by groups such as phenylmethyl, phenylethyl, phenylpropyl, phenylhexyl, and phenyloctyl. Therefore silane (a) can be a tetra-alkoxysilane such as a tetramethoxysilane, tetraethoxysilane, or tetrapropoxysilane. The preferred alkoxysilanes for purposes of the instant invention are tetramethoxysilane and tetraethoxysilane.

The silane of step (I) in the method of the instant invention can also be (b) an alcohol-treated halogenated silane. Halogenated silanes are exemplified by silanes such as bromosilanes, chlorosilanes, and fluorosilanes. Preferred silanes have the formula $R^2R^3R^4SiY$ wherein $R^2$, $R^3$ and $R^4$ are selected from hydrogen, alkyl groups having from 1 to 12 carbon atoms, alkenyl groups having from 2 to 12 carbon atoms, aryl groups, arylalkyl groups, and perfluoroalkylethyl groups having the formula $C_nF_{2n+1}CH_2CH_2$ where n is 1 to 6, and Y is a halogen atom. The groups $R^2$, $R^3$, and $R^4$ can be the same or different as desired. Alkyl groups suitable as $R^2$, $R^3$, or $R^4$ in the method of this invention include methyl, ethyl, propyl, butyl, hexyl, and octyl, aryl groups are exemplified by phenyl and naphthyl, arylalkyl groups are exemplified by groups such as phenylmethyl, phenylethyl, phenylpropyl, phenylhexyl, and phenyloctyl, and perfluoroalkylethyl groups include perflouromethylethyl, perfluorodiethyl, perflourobutylethyl, and perfluoroocylethyl. Alkenyl groups suitable as $R^2$, $R^3$, or $R^4$ in the method of this invention include vinyl and 5-hexenyl. Halogens suitable as Y for silane (b) in the method of this invention include fluorine, chlorine, bromine, and iodine. It is preferred for the method of this invention that Y is chlorine. Preferred silanes having the formula hereinabove include trimethylchlorosilane, triethylchlorosilane, trimethylbromosilane, triethylbromosilane, trimethylfluorosilane, triethylfluorosilane, dimethylvinylchlorosilane, and dimethyl-5-hexenylchlorosilane. The silanes delineated hereinabove are treated with an alcohol prior to their use in the method of this invention. Alcohols suitable for treating the silanes hereinabove prior to their use in the instant method include methanol, ethanol, propanol, butanol, hexanol, octanol, isopropanol, isobutanol, allyl alcohol, cyclohexanol, and benzyl alcohol. Preferred alcohols for treating the silanes exemplified above are ethanol, methanol, and isopropanol. The silanes may be treated with alcohol using any suitable means of application such as mixing with a spatula or a mechanical stirrer as long as the silane has been brought into contact with the alcohol prior to its use as silane (b). Preferably the alcohol is simply mixed with the silane prior to its use in the method of the instant invention. The ratio of silane to alcohol is not critical in the instant method as long as at least one weight percent of alcohol is used to treat the silane.

The silane of step (I) in the method of the instant can also be (c) alkyl silicates having units of the formula

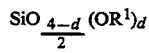

or a partial hydrolysis condensate thereof, wherein $R^1$ is a group selected from the group consisting of alkyl groups having from 1 to 6 carbon atoms, aryl groups, and arylalkyl groups, and d has a value of from 1 to 3, Thus $R^1$ is exemplified by alkyl groups such as methyl, ethyl, propyl, butyl, pentyl, and hexyl, by aryl groups such as monocyclic aryl groups exemplified by phenyl and naphthyl, and by arylalkyl groups such as phenylmethyl, phenylethyl, phenylpropyl, phenylhexyl, and phenyloctyl. Examples of the alkyl silicate or partial hydrolysis condensates thereof to be used as silane (c) in the method of the instant invention include tetraethylsilicate, tetramethylsilicate, tetrapropylsilicate, ethylpolysilicate, methylpolysilicate, and propyl polysilicate. Preferred as an alkyl silicate in the method of the instant invention is ethylpolysilicate.

The amount of silane employed in the method of the present invention varies depending on the amount of condensation catalyst and quenching agent (both are delineated hereinbelow) that is employed. It is preferred for purposes of this invention that from 5 to 75 weight percent of the silane be used, and it is highly preferred that from 30 to 40 weight percent of silane be employed, said weight percent being based on the total weight of silane, condensation catalyst, and quenching agent used in the instant method.

One of the silanes (a,b, or c) described hereinabove is then mixed with a condensation catalyst in Step (I) of this invention. The condensation catalyst of this invention serves a dual function, one is to promote the hydrolysis of alkoxysilanes to silanol (SiOH) and alcohol, and two to catalyze the condensation of two silanol groups to form SiOSi bonds and water. The condensation catalyst can also function to promote a reaction between alkoxysilanes and silanols to form SiOSi bonds and alcohol. The condensation catalyst is preferably an organic or inorganic protic acid. The condensation catalysts suitable for use in the method of the instant invention are exemplified by inorganic acids such as hydrochloric acid (HCL), hydrobromic acid (HBr), hydrogen iodide (HI), nitric acid ($HNO_3$), sulfuric acid ($H_2SO_4$), phosphoric acid ($H_3PO_4$), sulfonic acids (for example trifluoromethane sulfonic acid), and carbonic acid, and by organic acids such as acetic acids (for example trifluoroacetic acid), propionic acid, formic acid, benzoic acid, and salicylic acid, dicarboxylic acids such as oxalic acid, phthalic acid, sebacic acid, and adipic acid, and fatty acids such as oleic acid, palmitic acid, stearic acid, and phenylstearic acid. It is preferred in the method of this invention to employ a condensation catalyst selected from hydrochloric acid, sulfuric acid, and sulfonic acids.

It is preferred in the instant method to use an aqueous solution of the condensation catalyst hereinabove. The aqueous solution of catalyst must contain at least 5 weight percent of one of the catalysts delineated hereinabove and, in particular, the use of an aqueous solution of catalyst which contains at least 10 weight percent of catalyst is preferred.

The amount of condensation catalyst employed in the method of the present invention varies depending on the amount of silane and quenching agent that is employed. It is preferred for purposes of this invention that from 1 to 40 weight percent of the condensation catalyst be used, and it is highly preferred that from 5 to 15 weight percent of condensation catalyst be employed, said weight percent being based on the total weight of silane, condensation catalyst, and quenching agent used in the instant method.

The addition of the condensation catalyst to the silane in the method of the instant invention results in the polymerization of the mixture of step (i) to form a reaction mixture. Herein the term "polymerization" as applied to the methods of the present invention, generally denotes an acid catalyzed condensation of silicic acid derived from alkoxy group containing silanes. Polymerization of the mixture of (i) in the method of the instant invention preferably occurs in an age leg. The age leg consists of a length of pipe with sufficient volume to achieve the desired polymerization time at the flow rates employed in the reaction.

Step (II) in the method of the instant invention comprises adding a quenching agent to the reaction mixture of (I) whereby an aqueous layer or a condensation catalyst layer and an organic-silicone resin containing layer are formed. Herein the term "quenching" (or capping) as applied to the methods of the present invention, generally denotes the process of limiting further condensation of the silicic acid by blocking reactive sites with one or more compounds. The quenching agent of the instant invention is preferably a silane having the formula $R^5R^6R^7SiZ$ wherein $R^5$, $R^6$ and $R^7$ are selected from hydrogen, alkyl groups having from 1 to 12 carbon atoms, alkenyl groups having from 2 to 12 carbon atoms, aryl groups, arylalkyl groups, and perfluoroalkylethyl groups having the formula $C_nF_{2n+1}CH_2CH_2$ where n is 1 to 6, and Z is a halogen atom or is a group having the formula $OR^8$ wherein $R^8$ is a group selected from the group consisting of alkyl groups having from 1 to 6 carbon atoms, aryl groups, and arylalkyl groups. The groups $R^5$, $R^6$, and $R^7$ can be the same or different as desired. Alkyl groups suitable as $R^5$, $R^6$, or $R^7$ in the method of this invention include methyl, ethyl, propyl, butyl, hexyl, and octyl, aryl groups are exemplified by phenyl and naphthyl, arylalkyl groups are exemplified by groups such as phenylmethyl, phenylethyl, phenylpropyl, phenylhexyl, and phenyloctyl, and perfluoroalkylethyl groups include perflouromethylethyl, perfluorodiethyl, perflourobutylethyl, and perfluoroocylethyl. Alkenyl groups suitable as $R^5$, $R^6$, or $R^7$ in the method of this invention include vinyl and 5-hexenyl. Halogens suitable as Z for the quenching agent in the method of this invention include fluorine, chlorine, bromine, iodine, and astatine. It is preferred for the method of this invention that Z is chlorine. The alkyl groups, aryl groups, and arylalkyl groups for $R^8$ are as delineated above, including preferred embodiments thereof.

The quenching agent can also be a disiloxane having the formula $(R^5R^6R^7Si)_2O$ wherein $R^5$, $R^6$ and $R^7$ are all defined as above. The groups $R^5$, $R^6$, and $R^7$ can be the same or different as desired. Alkyl groups suitable as $R^5$, $R^6$, or $R^7$ in the disiloxane of the method of this invention are exemplified by methyl, ethyl, propyl, butyl, hexyl, and octyl, aryl groups are exemplified by phenyl and naphthyl, arylalkyl groups are exemplified by groups such as phenylmethyl, phenylethyl, phenylpropyl, phenylhexyl, and phenyloctyl, and perfluoroalkylethyl groups include perflouromethylethyl, perfluorodiethyl, perflourobutylethyl, and perfluoroocylethyl. Alkenyl groups suitable as $R^5$, $R^6$, or $R^7$ in the disiloxanes of the method of this invention include vinyl and 5-hexenyl. Examples of the disiloxanes which can be used in the method of the present invention include tetramethyldisiloxane, hexamethyldisiloxane, tetramethyldivinylsiloxane, tetramethyldi-5-hexenylsiloxane, tetramethyl-3,3,3-trifluoropropyldisiloxane, tetramethyldiethylsiloxane, tetramethyldiphenyldisiloxane, and diethyldiphenyldivinyldisiloxane. A mixture of two or more species of disiloxane can also be used. Preferred disiloxanes in the method of the instant invention are hexaalkyldisiloxanes, especially hexamethyldisiloxane.

An organic solvent which does not directly participate in the reaction may be optionally added to or mixed with the quenching agent in order to dilute the quenching agent or in order to provide for thorough mixing of the aqueous layer/organic layer. Examples of said organic solvents include methanol, ethanol, isopropanol, acetone, tetrahydrofuran (THF), methylene chloride, acetonitrile, methyl ethyl ketone, white spirits, chlorinated hydrocarbons and the like, benzene, toluene, and xylene. Preferred organic solvents in the method of this invention include heptane and xylene. The addition of the quenching agent to the mixture of (I) results in the separation of the solution into two layers, an aqueous layer, and an organic-silicone resin containing layer.

The amount of quenching agent employed in the method of the present invention varies depending on the amount of silane, condensation catalyst, and on the amount of organic solvent (if desired) that is employed. It is preferred for purposes of this invention that from 5 to 75 weight percent of the quenching agent be used, and it is highly preferred that from 20 to 40 weight percent of quenching agent be employed, said weight percent being based on the total weight of silane, condensation catalyst, and quenching agent used in the instant method.

Step (III) in the method of this invention comprises separating the aqueous layer or condensation catalyst layer from the organic-silicone resin containing layer. Separation of the organic-silicone-resin containing layer and the aqueous layer/condensation catalyst layer comprises allowing the non-miscible layers to phase separate and then drawing the less dense layer of the top and the more dense layer off the bottom of a separation vessel. The manner in which the two layers are mechanically separated is not critical as long as the two layers are isolated. Separation of the two layers may be accomplished by any of the separation methods well known to those skilled in the art. Separation of the two layers may be accomplished by evaporation, distillation, drying, gas absorption, sedimentation, solvent extraction, press extraction, adsorption, and filtration. It is preferred for purposes of this invention that the separation of the aqueous layer/condensation catalyst layer from the organic-silicone resin containing layer be accomplished by sedimentation.

Step (IV) in the method of the instant invention comprises stripping the organic-silicone resin containing layer. The organic-silicone resin containing layer is stripped to remove any excess quenching agent from the mixture. Methods of stripping volatile components are well known in the art and need no extensive delineation herein. Any method of removing volatile components can be used in the present invention, such methods exemplified by, but not limited to, distillation, evaporation, by passage of steam, air, or other gas through the liquid mixture, molecular stills, rotoevaporators, and wipe film evaporators. The preferred method of stripping the organic-silicone resin containing layer is by vacuum distillation.

It is critical to the method of the instant invention that the weight ratio of the silane delineated above to the condensation catalyst delineated above is constant throughout the method of this invention. The maintenance of this ratio allows the method of the instant invention to be continuous in nature.

The present invention further relates to a method for making a silicone resin, the method comprising the steps of (I) mixing in a continuous manner a silane selected from the group consisting of (i) alkoxysilanes, (ii) halogenated silanes, and (iii) alkyl silicates with a silicon compound selected from the group consisting of (iv) trialkylhalosilanes and (v) disiloxanes, (II) adding an alcohol to the mixture of (I), (III) adding water or a mixture of water and a condensation catalyst to the mixture of (II) whereby an aqueous layer and an organic-silicone resin containing layer are formed, (IV) separating the aqueous layer from the organic-silicone resin containing layer, (V) stripping the organic-silicone resin containing layer, wherein the weight ratio of said silane to said water or said mixture of condensation catalyst and water is constant throughout said method.

Step (I) in this second method of the present invention comprises mixing in a continuous manner a silane selected from the group consisting of (i) alkoxysilanes, (ii) halogenated silanes, and (iii) alkyl silicates with a silicon compound selected from the group consisting of (iv) trialkylhalosilanes and (v) disiloxanes.

Alkoxysilane (i) is a silane having the formula Si(OR)$_4$ wherein R is a group selected from the group consisting of alkyl groups having from 1 to 6 carbon atoms, aryl groups, and arylalkyl groups. Alkyl groups suitable as R in the method of this invention include methyl, ethyl, propyl, butyl, and hexyl, aryl groups are exemplified by phenyl and naphthyl, and arylalkyl groups are exemplified by groups such as phenylmethyl, phenylethyl, phenylpropyl, phenylhexyl, and phenyloctyl. Therefore alkoxysilane (i) can be a tetra-alkoxysilane such as a tetramethoxysilane, tetraethoxysilane, or tetrapropoxysilane. The preferred alkoxysilanes for purposes of the instant invention are tetramethoxysilane and tetraethoxysilane.

Halogenated silanes (ii) are exemplified by silanes such as bromosilanes, chlorosilanes, and fluorosilanes. Such silanes are exemplified by compounds having the formula SiX$_4$ wherein X is a halogen. Halogens suitable as X in the method of this invention include fluorine, chlorine, bromine, and iodine. It is preferred for the method of this invention that X is chlorine and thus preferred as silane (a) in the method of this invention tetrachlorosilane (SiCl$_4$).

The silane of step (I) in the method of the instant invention can also be (iii) an alkyl silicate. Preferred alkyl silicates as (iii) in this method of the invention are alkyl silicates having units of the formula

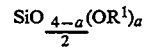

or a partial hydrolysis condensate thereof, wherein $R^1$ is a group selected from the group consisting of alkyl groups having from 1 to 6 carbon atoms, aryl groups, and arylalkyl groups, and a has a value of from 1 to 3.

Thus $R^1$ is exemplified by alkyl groups such as methyl, ethyl, propyl, butyl, pentyl, and hexyl, by aryl groups such as monocyclic aryl groups exemplified by phenyl and naphthyl, and by arylalkyl groups such as phenylmethyl, phenylethyl, phenylpropyl, phenylhexyl, and phenyloctyl. Examples of the alkyl silicate or partial hydrolysis condensates thereof to be used as silane (iii) in the method of the instant invention are exemplified by ethylpolysilicate, methylpolysilicate, and propyl polysilicate. Preferred as an alkyl silicate in the method of the instant invention is ethylpolysilicate.

The amount of silane employed in this method of the present invention varies depending on the amount of silicon compound, alcohol, water, and optionally condensation catalyst (all of which are delineated hereinbelow) that is employed. It is preferred for purposes of this invention that from 5 to 75 weight percent of the silane be used, and it is highly preferred that from 30 to 40 weight percent of silane be employed, said weight percent being based on the total weight of reactants employed in the instant method.

The silane of Step (I) is then mixed with a silicon compound selected from the group consisting of (iv) trialkylhalosilanes and (v) disiloxanes. Preferred trialkylhalosilanes have the formula $R^2R^3R^4SiY$ wherein $R^2$, $R^3$ and $R^4$ are selected from hydrogen, alkyl groups having from 1 to 12 carbon atoms, alkenyl groups having from 2 to 12 carbon atoms, aryl groups, arylalkyl groups, and perfluoroalkylethyl groups having the formula $C_nF_{2n+1}CH_2CH_2$ where n is 1 to 6, and Y is a halogen atom. The groups $R^2$, $R^3$, and $R^4$ can be the same or different as desired. Alkyl groups suitable as $R^2$, $R^3$, or $R^4$ in the method of this invention include methyl, ethyl, propyl, butyl, hexyl, and octyl, aryl groups are exemplified by phenyl and naphthyl, arylalkyl groups are exemplified by groups such as phenylmethyl, phenylethyl, phenylpropyl, phenylhexyl, and phenyloctyl, and perfluoroalkylethyl groups include perflouromethylethyl, perfluorodiethyl, perflourobutylethyl, and perfluoroocylethyl. Alkenyl groups suitable as $R^2$, $R^3$, or $R^4$ in the disiloxanes of the method of this invention include vinyl and 5-hexenyl. Halogens suitable as Y for silane (b) in the method of this invention include fluorine, chlorine, bromine, and iodine. It is preferred for the method of this invention that Y is chlorine. Preferred trialkylhalosilanes include trimethylchlorosilane, triethylchlorosilane, trimethylbromosilane, triethylbromosilane, trimethylfluorosilane, triethylfluorosilane, dimethylvinylchlorosilane, and dimethyl-5-hexenylchlorosilane..

The silicon compound can also be a disiloxane (v). Preferred disiloxanes are siloxanes having the formula $(R^5R^6R^7Si)_2O$ wherein $R^5$, $R^6$ and $R^7$ are all defined as above. The groups $R^5$, $R^6$, and $R^7$ can be the same or different as desired. Alkyl groups suitable as $R^5$, $R^6$, or $R^7$ in the disiloxane of the method of this invention are exemplified by methyl, ethyl, propyl, butyl, hexyl, and octyl, aryl groups are exemplified by phenyl and naphthyl, arylalkyl groups are exemplified by groups such as phenylmethyl, phenylethyl, phenylpropyl, phenylhexyl, and phenyloctyl, and perfluoroalkylethyl groups include perflouromethylethyl, perfluorodiethyl, perflourobutylethyl, and perfluorooctylethyl. Alkenyl groups suitable as $R^5$, $R^6$, or $R^7$ in the disiloxanes of the method of this invention include vinyl and 5-hexenyl. Examples of the disiloxanes which can be used in the method of the present invention include tetramethyldisiloxane, hexamethyldisiloxane, tetramethyldivinylsiloxane, tetramethyldi-5-hexenylsiloxane, tetramethyl-3,3,3-trifluoropropyldisiloxane, tetramethyldiethylsiloxane, tetramethyldiphenyldisiloxane, and diethyldiphenyldivinyldisiloxane. A mixture of two or more species of disiloxane can also be used. Preferred disiloxanes in the method of the instant invention are hexaalkyldisiloxanes, especially hexamethyldisiloxane.

The amount of silicon compound employed in this method of the present invention varies depending on the amount of silane, alcohol, water, and optionally condensation catalyst that is employed. It is preferred for purposes of this invention that from 5 to 75 weight percent of the silicon compound be used, and it is highly preferred that from 20 to 40 weight percent of silicon compound be employed, said weight percent being based on the total weight of reactants employed in the instant method.

Step (II) in this second method of the invention comprises adding an alcohol to the mixture of Step (I). Alcohols suitable for use in the instant method include methanol, ethanol, propanol, butanol, hexanol, octanol, isopropanol, isobutanol, allyl alcohol, cyclohexanol, and benzyl alcohol. Preferred alcohols for addition to the mixture of step (I) include ethanol, methanol, and isopropanol. The alcohol may be added to the mixture of step (I) using any suitable means such as mixing with a spatula or a mechanical stirrer. Preferably the alcohol is simply mixed in with the mixture produced by step (I) in the method of the instant invention.

The amount of alcohol employed in this method of the present invention varies depending on the amount of silane, silicon compound, water, and optionally condensation catalyst that is employed. It is preferred for purposes of this invention that from greater than zero to 50 weight percent of the alcohol be used, and it is highly preferred that from 5 to 20 weight percent of alcohol be employed, said weight percent being based on the total weight of reactants employed in the instant method.

Step (III) of the instant invention comprises adding water or a mixture of water and a condensation catalyst to the mixture of (II) whereby an aqueous layer and an organic-silicone resin containing layer are formed. Thus water or a mixture of water and a condensation catalyst is added to the mixture produced by step (II) in the method of the instant invention. The condensation catalyst in the method of this invention serves a dual function, one is to promote the hydrolysis of alkoxysilanes to silanol (SiOH) and alcohol, and two to catalyze the condensation of two silanol groups to form SiOSi bonds and water. The condensation catalyst can also function to promote a reaction between alkoxysilanes and silanols to form SiOSi bonds and alcohol. This reaction is less likely due to the acidic conditions present in the method of the present invention. The condensation catalyst is preferably an organic or inorganic protic acid. The condensation catalysts suitable for use in the method of the instant invention are exemplified by inorganic acids such as hydrochloric acid (HCL), hydrobromic acid (Hbr), hydrogen iodide (HI), nitric acid ($HNO_3$), sulfuric acid ($H_2SO_4$), phosphoric acid ($H_3PO_4$), sulfonic acids (for example trifluoromethane sulfonic acid), and carbonic acid, and by organic acids such as acetic acids (for example trifluoroacetic acid), propionic acid, formic acid, benzoic acid, and salicylic acid, dicarboxylic acids such as oxalic acid, phthalic acid, sebacic acid, and adipic acid, and fatty acids such as oleic acid, palmitic acid, stearic acid, and phenylstearic acid. It is preferred in the method of this invention to employ a condensation catalyst selected from hydrochloric acid, sulfuric acid, and sulfonic acids.

It is preferred in the instant method to use an aqueous solution of the condensation catalyst hereinabove. The aqueous solution of catalyst must contain at least 5 weight percent of one of the catalysts delineated hereinabove and, in particular, the use of an aqueous solution of catalyst which contains at least 10 weight percent of catalyst is preferred. The addition of water or a water/condensation catalyst mixture to the mixture of step (II) results in the formation of an aqueous layer and an organic-silicone resin containing layer.

The amount of water employed in the method of the present invention varies depending on the amount of silane, silicon compound, alcohol, and optionally condensation catalyst that is employed. If water only is used in step (III) of the method of this invention then it is preferred for purposes of this invention that from 5 to 50 weight percent of water be used, and it is highly preferred that from 20 to 30 weight percent of water be employed, said weight percent being based on the total weight of reactants employed in the instant method. However, if a mixture of water and condensation catalyst is employed then it is preferred that the water and condensation catalyst be added at a ratio of from 99 weight percent of water to 1 weight percent of catalyst, and it is highly preferred that it be added at a ratio of from 90 weight percent of water to 10 weight percent of catalyst.

Step (IV) in the second method of this invention comprises separating the aqueous layer from the organic-silicone resin containing layer. The separation of the two layers may be accomplished as is described above in the first method of this invention including preferred embodiments thereof.

Step (V) in the second method of the instant invention comprises stripping the organic-silicone resin containing layer. Stripping of the organic-silicone resin containing layer may be accomplished as is described above for the first method of this invention including preferred embodiments thereof.

This method of the invention can further comprise heating the mixture after step (III). The mixture in this method of the invention is preferably heated at a temperature of about 20° C. to 100° C. and more highly preferred is that the mixture be heated at a temperature of from about 40° to 70° C.

It is critical to the methods of the instant invention that the weight ratio of the silane delineated above to the condensation catalyst, water, or mixture thereof, delineated above, is constant throughout the method of this invention. The maintenance of this weight ratio allows the methods of the instant invention to be continuous in nature. The continuous methods of the instant invention are more cost effective and provide more reproducibility in the final products than do batch type methods.

Examples of specific resins produced by the method of the present invention include MQ resins having various ratios of M to Q. A wide variety of resins can be produced via the method of the instant invention and the resins produced are dependent on the creativity of addition and selection of reactants.

The method of the present invention provides for incorporation of organofunctionality in the resin structure by the choice of the starting silanes. For example, by starting with tetraethylorthosilicate, a siloxane resin consisting essentially of $(CH_3)_3SiO_{\frac{1}{2}}$ and $SiO_2$ units and having a $(CH_3)_3SiO_{\frac{1}{2}}/SiO_2$ ratio of 0.4/1 to 4.0/1 is produced. By starting with a methyltriethoxysilane a methylsilsesquioxane would be produced, and by starting with dimethyldialkoxysilanes one could obtain polydimethylsiloxane polymers. Thus, through the addition of combinations of the above delineated starting materials, a continuum of material types could be produced ranging from polydimethylsiloxanes to resins.

The preferred resins made by the methods of this invention are MQ siloxane resins having a predetermined content of SiH groups. MQ siloxane resins where less than 10% of the monovalent groups have SiH functionality can be produced. The MQ resins made according to the method of this invention may have up to 5% by weight groups of the formula OH and OR. The resins obtained by the methods of this invention may be used for a variety of purposes such as in the synthesis of siloxane molecules, and by employing the reactivity of SiH groups, in reactions with organic and organosilicon compounds having olefinic unsaturation.

Other reactants can be sequentially or concurrently added to derive a novel resin having desired physical and chemical properties. All of the resins produced by the methods of this invention have a high purity due to the method of manufacture. The acid or base impurities are often very low.

The reaction temperature in the methods of the present invention is in the range from 20° C. to 100° C. or preferably is maintained at a constant temperature of between 40° and 70° C.

A specific example of a reaction apparatus for practicing the subject methods of the instant invention is shown in FIG. 1 of the drawing. Considering the drawing in greater detail, FIG. 1 shows a twelve liter five neck round bottom flask (10) placed in heating mantle (12). One neck was fitted with reflux condenser (14), one neck was fitted with thermocouple (16), and the center neck was equipped with mechanical stirrer (18). A first tank having an inert nitrogen atmosphere (20) was connected with a feed line to a first peristaltic pump (22) and a second tank having an inert nitrogen atmosphere (24) was connected with a feed line to a second peristaltic pump (26) and set up such that the outputs of pumps (22) and (26) were combined at first static mixer (28). A third tank having an inert nitrogen atmosphere (30) was connected by a feed line to a third peristaltic pump (32) and set up such that the output of the third pump was directed to second static mixer (34). The output of first static mixer (28) was then combined with the output of third tank (30) at third static mixer (36). The output from the third static mixer (36) was fed via feed line into age leg (38), which consisted of a coil of teflon tubing of appropriate length. The age leg (38) was immersed in constant temperature bath (40) to control the reaction temperature. The output of the age leg (38) was fed to the neck (42) which was connected to the neck housing thermocouple (16) of flask (10>. A fourth tank having an inert nitrogen atmosphere (44) was connected by a feed line to a fourth peristaltic pump (46) and was set up to deliver materials directly from the fourth tank (44) to the neck (48) which was connected to the neck housing reflux condenser (14) of flask (10). A fifth tank having an inert nitrogen atmosphere (50) was connected by a feed line to a fifth peristaltic pump (52) and was set up with a three way valve such that its output could either be directed directly to flask (10) through neck (48) or directed through a feed line to the second static mixer (34), where its output could be combined with the output of tank (30). It should be apparent to one skilled in the art that other reaction apparatus can be used for practicing the instant method.

The number average molecular weight (Mn) and weight average molecular weight (Mw) of the samples hereinbelow was determined by Gel Permeation Chromatography (GPC). The molecular weight distributions were determined by size exclusion chromatography (i.e. GPC) using chloroform as the mobile phase and infrared detection at 9.1 microns. The calibration standards were narrow molecular weight fractions of similar materials validated by vapor phase osmometry.

Polydispersity was determined by dividing the weight average molecular weight by the number average molecular weight (Mw) of the samples hereinbelow (i.e. Mw/Mn).

The measured concentration of SiH as H was measured as a percent by weight and was measured by reducing mercuric chloride with silane hydrogen. Silane hydrogen reduces mercuric chloride to liberate two moles of hydrochloric acid per mole of silane ($R_3SiH$). The liberated acid is quantitatively titrated with alcoholic potassium hydroxide and the result calculated as percent hydrogen.

The ratio of M ($R_3SiO_{\frac{1}{2}}$) units to Q ($SiO_2$) units was determined by Silicon (29) NMR ($^{29}Si$). A ratio of the integral for the M region and the Q region on the NMR spectra was compared to determine the ratio of M units to Q units.

EXAMPLE 1

In the apparatus described above, the first tank (20) was filled with ethanol, the second tank (24) with 10% hydrochloric acid, the third tank (30) was filled with tetraethylorthosilicate, the fourth tank (44) was filled with hexamethyldisiloxane, and the fifth tank (50) was filled with heptane. The age leg (38) for this run consisted of an 18 ft length of $\frac{3}{8}$ inch OD (outer diameter) tubing. The constant temperature bath (40) was brought to 50° C. The hexamethyldisiloxane and heptane flows were started and set to 24 and 40 grams/minute (min) respectively. The flask (10) temperature was set for 75° C. After a few minutes, the ethanol and hydrochloric acid flows were started and set to 20 and 50 grams/min respectively. After one minute the tetraethylorthosilicate (TEOS) flow was established at 49 grams/min. Flows were maintained until 1000 grams of TEOS had been pumped at which point all flows were discontinued. Heating in the flask (10) was continued for an additional 60 minutes at which time heating and stirring were discontinued. The phases were separated and the resin containing organic phase was washed with water. The solvent was removed in vacuo to yield a resin with a number average molecular weight (Mn) of 2899 and a weight average molecular weight (Mw) of 9551.

EXAMPLE 2

The first tank (20) was filled with a solution consisting of 1400 grams of water, 760 grams of ethanol and 400 grams of concentrated sulfuric acid. The second tank (24) was filled with a solution made up of 1001.5 grams of tetraethylorthosilicate and 396.9 grams of hexamethyldisiloxane. The constant temperature bath (40) was set to 50° C. The flow of the acid solution was started and brought to 44.6 grams/min and the flask (10) temperature set to 65° C. The flow of the silane solution was started and established at 50.8 grams/min. Pumping was continued until the silane solution was exhausted. All flows were stopped and heating in the flask was continued for an additional twenty minutes. 200 grams of Xylene was added to the flask. The resin containing organic phase was separated, washed with water and stripped to 70% solids. A resin was obtained and GPC determined that the resin had a Mn of 1487 and a Mw of 1842.

EXAMPLE 3

The first tank (20) was filled with 512 grams of HCl (hydrochloric acid) and 440 g THF (Tetrahydrofuran). The second tank (24) was filled with 1006 grams of tetraethylorthosilicate. The flask (10) was charged with 505 g of hexamethyldisiloxane, 1000 grams of heptane and 160 grams of $ViMe_2SiCl$. The flask was brought to a temperature of 65° C. The constant temperature bath (40) around the age leg (38) (a 50 foot section of $\frac{1}{4}$ inch teflon tubing) was set to 65° C. The acid flow was started and brought to 44.9 milliliters/min. Then the flow of tetraethylorthosilicate was started and brought to 55.8 milliliters/min. The flow was continued until all of the tetraethylorthosilicate was consumed. The flask (10) was kept at temperature for an additional hour. The phases were separated and the resin containing organic phase was washed. Xylene was added and the material stripped invacuo to give a product as a 70% solids solution in xylene. A resin was obtained and GPC determined that the resin had a Mn of 5464 and a Mw of 106500.

EXAMPLE 4

The first tank (20) was filled with 605 grams of concentrated HCl and 462 grams of ethanol. The second tank (24) was filled with 1000 grams of tetraethylorthosilicate and 48 grams of vinyltriethoxysilane. In the twelve liter flask (10) was placed a mixture of 523 grams of hexamethyldisiloxane, 60 grams of concentrated HCl and 1010 grams of heptane. The temperature of the twelve liter flask (10) was brought to 65° C. and the constant temperature bath (40) around the age leg (38) (a 75 ft section of $\frac{1}{4}$ inch teflon tubing) was set at 50° C. The acid flow was started and established at 47.6 milliliters/min and the silane flow was started and set at 51.2 milliliters/min. Pumping was continued until the second tank (24) was exhausted. The reaction was kept at 65° C. for an additional hour, allowed to cool, the phases separated, the resin containing organic phase was washed and the solvent removed to yield the resin as a viscous liquid having a Mn of 5883, and a Mw 56950.

EXAMPLE 5

The first tank (20) was filled with 1575 grams of concentrated HCl and 1155 grams of ethanol. The second tank (24) was filled with 2500 grams of tetraethylorthosilicate. In the twelve liter flask (10) was placed 2000 grams of a disiloxane having the average formula $(HMe_2Si)_2O$, 2000 grams of heptane and 60 grams of concentrated HCl. The flask (10) was brought to 55° C. and the constant temperature bath (40) around the age leg (38) (a 75 ft section of $\frac{1}{4}$ inch teflon tubing) was set at 30° C. The acid flow was started and set to 47.1 milliliters/min and then the flow of tetraethylorthosilicate was established at 53.4 milliliters/min. Pumping was continued until the tetraethylorthosilicate was exhausted. The flask (10) was maintained at temperature for an additional 90 minutes. The resin containing organic layer was separated, washed with water and stripped to yield a resinous product having a Mn 1017, a Mw of 19170, and an SiH content 0.52 weight percent.

EXAMPLE 6

The first tank (20) was filled with 1813 grams of tetraethylorthosilicate, the second tank (24) was filled with 1040 grams of trimethylchlorosilane, the third tank (30) was filled with 261 grams of absolute ethanol and the fifth tank (50) was filled with 750 grams of water. The streams from these tanks (tanks (20), (24), (30), and (50)) were pumped directly into a stirred reactor flask (10) containing 500 grams of heptane at the following rates: TEOS (tetraethylorthosilicate) 0.36 moles/min, trimethylchlorosilane 0.40 moles/min, ethanol 0.23 moles/min, and water 1.72 moles/min. A total of 1510 grams of TEOS, 865 grams of trimethylchlorosilane, 212 grams of ethanol and 624 grams of water were added to the reactor flask (10). The temperature was maintained at 60° C. for 2 hours after the addition was complete. The agitation was stopped and the organic layer separated and washed free of residual HCL and dried. The heptane solvent was stripped away yielding 980 grams of a resin with having a ratio of M ($R_3SiO_{\frac{1}{2}}$) units to Q ($SiO_2$) units of 1.1 and having a Mn of 1520 and a polydispersity of 1.5.

EXAMPLE 7

The first tank (20) was charged with 900 grams of TEOS, the second tank (24) was charged with 800 grams of absolute ethanol, the third tank (30) was charged with 1500 grams of 18% HCL in distilled water, the fourth tank (44) was charged with 400 grams of trimethylchlorosilane and the reactor flask (10) was charged with 187 grams of hexamethyldisiloxane. TEOS at 0.2 moles/min, ethanol at 0.81 moles/min, and aqueous 18% HCl solution ($H_2O$/HCl) at 2.0 moles/min were mixed together in the third static mixer (36) and aged in a plug flow tube (age leg (38)) for approximately 4 minutes at 60° C. This mixture was added to the reactor flask (10) and the trimethylchlorosilane from the fourth tank (44) was fed directly to the reactor flask (10) at a rate of 0.16 moles/min (i.e. the rate at which it would be consumed by the reactive silica sol). The mixture was heated for 1 hour at 60° C. after the addition had ceased. The organic layer was separated from the aqueous layer and washed free of residual acid, dried and then the solvent, hexamethyldisiloxane, was removed by vacuum distillation leaving a solid resin whose ratio of M ($R_3SiO_{\frac{1}{2}}$) units to Q ($SiO_2$) units by $^{29}Si$ NMR was 0.83.

EXAMPLE 8

As in the previous example, the first tank (20) was charged with 900 grams of TEOS, the second tank (24) was charged with 800 grams of absolute ethanol, the third tank (30) was charged with 1000 grams of a 9% aqueous HCl solution, and the fourth tank (44) was charged with a mixture of 470 grams of trimethylchlorosilane and 521 grams of vinyldimethylchlorosilane and the reactor flask (10) was charged with 234 grams of hexamethyldisiloxane and 268 grams of 1,2-divinyltetramethyldisiloxane. The silica sol was created by pumping TEOS at 0.2 moles/min, ethanol at 0.81 moles/min, and the 9% aqueous HCl solution (water/HCl) at 2.0 moles/min together through the third static mixer (36) and ageing the sol for 40 seconds in a plug flow tube (age leg (38)) at 60° C. The sol was then fed into a 60° C. stirred reactor flask (10) and the chlorosilanes from the fourth tank (44) were pumped into the reactor flask (10) at a rate of 0.2 moles/min (the rate at which they are consumed by the reactive sol). After the addition of the reactants had ceased the mixture was stirred for 1 hour at 60° C. and then the organic layer separated from the aqueous layer and washed free of residual acid with water. The organic layer was then dried and the disiloxane solvent was removed by vacuum distillation yielding a liquid resin with a GPC Mn of 1420 and a polydispersity of 1.4.

EXAMPLE 9

The first tank (20) was loaded with 1300 grams of TEOS, the second tank (24) was loaded with 90 grams of absolute ethanol, the third tank (30) was loaded with 760 grams of distilled water, the fifth tank (50) was loaded with 678 grams of trimethylchlorosilane and 419 grams of tetramethyldisiloxane, and the reactor flask (10) was charged with 500 grams of n-heptane. The reactants were pumped together through the third static mixer (36) into the stirred reactor flask (10) at the following rates: TEOS at 0.36 moles/min, ethanol at 0.23 moles/min, water at 2.43 moles/min, chlorosilane and disiloxane at 0.36 moles/min. After the addition was completed the mixture was heated at 40° C. for 1 hour, the agitation was stopped and the layers allowed to separate. The organic layer was washed free of HCl and dried and the n-heptane was removed by vacuum distillation. The resulting resin had a GPC Mn of 890 and polydispersity of 1.4. The measured concentration of SiH as H was 0.48% (w/w) percent by weight.

EXAMPLE 10

The first tank (20) was filled with 1130 grams of Silbond ® 40 (a condensed alkylpolysilicate containing 40% $SiO_2$ from Akzo Chemical, Inc., Chicago, Ill. 60606), the second tank (24) was loaded with 866 grams of trimethylchlorosilane and 199 grams of tetramethyldisiloxane, the third tank (30) was filled with 226 grams of absolute ethanol, and the fifth tank (50) was filled with 916 grams of deionized water and the reactor flask (10) was charged with 500 grams of n-heptane. The reactants were pumped together through the third static mixer (36) into the stirred reactor flask (10) at the following rates: Silbond ® 40 at 0.5 moles/min, the trimethylchlorosilane/tetramethyldisiloxane mixture at 0.73 moles/min (0.53 moles/min trimethylchlorosilane and 0.20 moles/min tetramethyldisiloxane, respectively), ethanol at 0.33 moles/min, and water at 3.38 moles/min. After 857 grams of Silbond ® 40, 663 grams of trimethylchlorosilane, 153 grams of tetramethyldisiloxane, 170 grams of ethanol, and 693 grams of water were added to the reactor flask (10), the temperature of the flask (10) was held at 40° C. for 2 hours. Agitation was stopped and the aqueous layer was drained away from the organic-resin containing layer, the organic layer was washed free of HCl and dried. The heptane was removed by vacuum distillation leaving 864 grams of a resin with GPC Mn of 1307 and a polydispersity of 4.2. The SiH as % H was 0.23 percent by weight.

EXAMPLE 11

The first tank (20) was filled with 967 grams of Silbond ® 40 (a condensed ethylpolysilicate having 40% $SiO_2$ from Akzo Chemical, Inc., Chicago, Ill. 60606), the second tank (24) was filled with 1017 grams of trimethylchlorosilane and 292 grams of methyldichlorosilane, the third tank (30) was filled with 192 grams of absolute ethanol, the fifth tank (50) was filled with 783 grams of deionized water and the reactor flask (10) was charged with 500 grams of n-heptane. The reactants were pumped together through the third static mixer (36) into the stirred reactor flask (10) at the following rates: Silbond 40 ® at 0.4 moles/min, the trimethylchlorosilane/methyldichlorosilane mixture at 0.74 moles/min (0.58 trimethylchlorosilane and 0.16 moles/min methyldichlorosilane respectively), ethanol at 0.26 moles/min and water at 2.70 moles/min (506 grams). After 634 grams of Silbond ® 40, 670 grams of trimethylchlorosilane, 192 grams of methyldichlorosilane, 170 grams of ethanol, and 693 grams of water were added to the reactor flask (10), the temperature of the flask (10) was held at 40° C. for 3 hours. Agitation was stopped and the aqueous layer removed, the organic layer washed free of residual acid, dried and the heptane removed by vacuum distillation, yielding 458 grams of a viscous resin. The GPC Mn was 2900 and the Mw was 110000. The SiH as % H was 0.19 percent by weight.

It should be apparent from the foregoing that many other variations and modifications may be made in the compounds, compositions and methods described herein without departing substantially from the essential features and concepts of the present invention. Accordingly it should be clearly understood that the forms of the invention described herein are exemplary only and are not intended as limitations on the scope of the present invention as defined in the appended claims.

That which is claimed is:

1. A method for making a silicone resin, the method comprising the steps of:
   (I) mixing in a continuous manner a silane selected from the group consisting of:
      (a) a silane having the formula $SiX_4$ wherein X is a halogen atom or a group having the formula OR wherein R is a group selected from the group consisting of alkyl groups having from 1 to 6 carbon atoms, aryl groups, and arylalkyl groups;
      (b) alcohol treated halogenated silanes; and
      (c) alkyl silicates having units of the formula

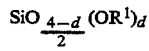

or a partial hydrolysis condensate thereof, wherein $R^1$ is a group selected from the group consisting of alkyl groups having from 1 to 6 carbon atoms, aryl groups, and arylalkyl groups, and d has a value of from 1 to 3, with a condensation catalyst;
   (II) adding a quenching agent to the reaction mixture of (I), whereby an aqueous layer or condensation catalyst layer and an organic-silicone resin containing layer are formed;
   (III) separating the aqueous layer or condensation catalyst layer from the organic-silicone resin containing layer; and
   (IV) stripping the organic-silicone resin containing layer; wherein the weight ratio of said silane to said condensation catalyst is constant throughout said method.

2. A method according to claim 1, wherein X is chlorine.

3. A method according to claim 1, wherein (a) is selected from the group consisting of tetramethoxysilane, tetraethoxysilane, or tetrapropoxysilane.

4. A method according to claim 1, wherein the halogenated silane of (b) is a compound having the formula $R^2R^3R^4SiY$ wherein $R^2$, $R^3$ and $R^4$ are selected from hydrogen, alkyl groups having from 1 to 12 carbon atoms, alkenyl groups having from 2 to 12 carbon atoms, aryl groups, arylalkyl groups, or perfluoroalkylethyl groups having the formula $C_nF_{2n+1}CH_2CH_2$ where n is 1 to 6, and Y is a halogen atom.

5. A method according to claim 4, wherein the halogenated silane of (b) is selected from the group consisting of trimethylchlorosilane, triethylchlorosilane, trimethylbromosilane, triethylbromosilane, trimethylfluorosilane, triethylfluorosilane, dimethylvinylchlorosilane, and dimethyl-5-hexenylchlorosilane.

6. A method according to claim 1, wherein the alcohol of (b) is selected from the group consisting of ethanol, methanol, and isopropanol.

7. A method according to claim 1, wherein (c) is ethylpolysilicate.

8. A method according to claim 1, wherein the condensation catalyst is selected from the group consisting of hydrochloric acid, sulfuric acid, and sulfonic acids.

9. A method according to claim 1, wherein the quenching agent is selected from the group consisting of
   (i) a disiloxane having the formula $(R^5R^6R^7Si)_2O$ and
   (ii) a silane having the formula $R^5R^6R^7SiZ$ wherein $R^5$, $R^6$ and $R^7$ are selected from hydrogen, alkyl groups having from 1 to 12 carbon atoms, alkenyl groups having from 2 to 12 carbon atoms, aryl groups, arylalkyl groups, and perfluoroalkylethyl groups having the formula $C_nF_{2n+1}CH_2CH_2$ where n is 1 to 6, and Z is a halogen atom or is a group having the formula $OR^8$ wherein $R^8$ is a group selected from the group consisting of alkyl groups having from 1 to 6 carbon atoms, aryl groups, and arylalkyl groups.

10. A method according to claim 9, wherein Z is chlorine.

11. A method according to claim 9, wherein the disiloxane is selected from the group consisting of tetramethyldisiloxane, hexamethyldisiloxane, tetramethyldivinylsiloxane, tetramethyldi-5-hexenylsiloxane, tetramethyl-3,3,3-trifluoropropyldisiloxane, tetramethyldiethylsiloxane, tetramethyldiphenyldisiloxane, and diethyldiphenyldivinyldisiloxane.

12. A method according to claim 1, wherein the quenching agent further comprises an organic solvent.

13. A method according to claim 12, wherein the organic solvent is selected from the group consisting of heptane and xylene.

14. A method for making a silicone resin, the method comprising the steps of:
   (I) mixing in a continuous manner a silane selected from the group consisting of:
      (i) alkoxysilanes,
      (ii) halogenated silanes, and
      (iii) alkyl silicates
   with a silicon compound selected from the group consisting of:
      (iv) trialkylhalosilanes and
      (v) disiloxanes;
   (II) adding an alcohol to the mixture of (I);
   (III) adding water or a mixture of water and a condensation catalyst to the mixture of (II) whereby an aqueous layer and an organic-silicone resin containing layer are formed;

(IV) separating the aqueous layer from the organic-silicone resin containing layer;

(V) stripping the organic-silicone resin containing layer; wherein the weight ratio of said silane to said water or to said mixture of water and condensation catalyst is constant throughout said method.

15. A method according to claim 14, wherein (i) is a silane having the formula Si(OR)$_4$ wherein R is a group selected from the group consisting of alkyl groups having from 1 to 6 carbon atoms, aryl groups, and arylalkyl groups.

16. A method according to claim 15, wherein (i) is selected from the group consisting of tetramethoxysilane, tetraethoxysilane, and tetrapropoxysilane.

17. A method according to claim 14, wherein (ii) is a compound having the formula SiX$_4$ wherein X is a halogen.

18. A method according to claim 17, wherein X is chlorine.

19. A method according to claim 14, wherein (iii) is an alkyl silicate having units of the formula $$SiO_{\frac{4-a}{2}}(OR^1)_a$$

or a partial hydrolysis condensate thereof, wherein R$^1$ is a group selected from the group consisting of alkyl groups having from 1 to 6 carbon atoms, aryl groups, and arylalkyl groups, and a has a value of from 1 to 3.

20. A method according to claim 19, wherein (iii) is ethylpolysilicate.

21. A method according to claim 14, wherein (iv) is a compound having the formula R$^2$R$^3$R$^4$SiY wherein R$^2$, R$^3$ and R$^4$ are selected from hydrogen, alkyl groups having from 1 to 12 carbon atoms, alkenyl groups having from 2 to 12 carbon atoms, aryl groups, arylalkyl groups, or perfluoroalkylethyl groups having the formula C$_n$F$_{2n+1}$CH$_2$CH$_2$ where n is 1 to 6, and Y is a halogen atom.

22. A method according to claim 21, wherein Y is chlorine.

23. A method according to claim 21, wherein (iv) is selected from the group consisting of trimethylchlorosilane, triethylchlorosilane, trimethylbromosilane, triethylbromosilane, trimethylfluorosilane, triethylfluorosilane, dimethylvinylchlorosilane, and dimethyl-5-hexenylchlorosilane.

24. A method according to claim 14, wherein (v) is a disiloxane having the formula (R$^5$R$^6$R$^7$Si)$_2$O wherein R$^5$, R$^6$ and R$^7$ are selected from hydrogen, alkyl groups having from 1 to 12 carbon atoms, alkenyl groups having from 2 to 12 carbon atoms, aryl groups, arylalkyl groups, and perfluoroalkylethyl groups having the formula C$_n$F$_{2n+1}$CH$_2$CH$_2$ where n is 1 to 6.

25. A method according to claim 24, wherein the disiloxane is selected from the group consisting of tetramethyldisiloxane, hexamethyldisiloxane, tetramethyldivinylsiloxane, tetramethyldi-5-hexenylsiloxane, tetramethyl-3,3,3-trifluoropropyldisiloxane, tetramethyldiethylsiloxane, tetramethyldiphenyldisiloxane, and diethyldiphenyldivinyldisiloxane.

26. A method according to claim 14, wherein the alcohol is selected from the group consisting of ethanol, methanol, and isopropanol.

27. A method according to claim 14, wherein the condensation catalyst is selected from the group consisting of hydrochloric acid, sulfuric acid, and sulfonic acids.

28. A composition produced in accordance with claim 1.

29. A composition produced in accordance with claim 14.

30. A method according to claim 14, further comprising heating the mixture after step (III).

* * * * *